ated Dec. 13, 1966

3,291,729
METHOD OF TREATING SEWAGE
Richard P. Martin, 1428 N. Broad St.,
Philadelphia, Pa. 19121
No Drawing. Filed Sept. 21, 1964, Ser. No. 398,081
1 Claim. (Cl. 210—13)

This invention relates to the improvement in materials and methods used in sewage treatment plants for the abatement of the difficulties, the annoyances, the odors, and the hazards caused by the inordinate foam, greases, and fats in modern sewage. Unusually large volumes of water are imperatively required for drinking, washing, agriculture, industry, etc., in our presently diverse and complex economy and culture—and indirectly become a part of the influent sewage of a community or an area and must be reclaimed by sewage treatment plants before the water can be restored to its original and predetermined functions.

Previously, sedimentation and filtration could be substantially dependable processes for the elimination of most of the deleterious factors encountered in the sewage of a decade or so ago. But, with the advent of detergents of several types—synthetic, amphoteric, non-ionic, cationic, etc.—the character of present day sewage has changed profoundly not only with respect to the components dissolved and suspended in its influent water, but also to the voluminous and persistent foam that accompanies the sewage as it passes through a sewage disposal and treatment plant. Furthermore, an increasing domestic use of garbage disposal units has diverted large quantities of oils, fats, and greases from the garbage pail to the sewage outlet and, consequently, imposes serious and insoluble problems upon the sewage treatment and disposal plant of a municipality or a community.

In a word, the inordinate increase in sewage of fats, greases, and detergents—if permitted to run uncontrolled or if counteracted by obsolete, conventional methods—will induce accumulated deposits of fats and greases in the piping, the pumps, the tanks, the digesters, and the related equipment of a sewage disposal plant. Foam will build up to objectionable levels, especially in the aeration tanks of a plant. Inevitably, undesirable concentrations of noisome odors will develop concurrently with other annoying and unwanted results. And, it obviously follows that digesters functioning improperly will produce on their drying beds a sludge of questionable worth and an abhorrent odor.

An objective of the present invention is to provide a composition of matter that prevents a clogging of grease and floating debris in a pumping station, that when sprayed directly or dripped into the influent sewage or mixed with water is sprayed on the filter stones in low and high rate filtration beds to eliminate grease from the filtering media, and that inhibits an accumulation of filter flies through drowning because of a wetting of the wings of their larvae. It is also an observable condition that the composition of matter of this invention does not disturb a useful algal growth in the treatment sections of a plant, but is lethal to any abounding cockroaches.

Another purpose of the invention is to provide a composition of matter that allows normal algal growth at various places throughout a sewage disposal plant, that prevents any adverse influence by the accumulated fats in sewage on the bacterial action in the digesters, and deaerates the surface fats and greases that build up on pipes, tanks, etc. and forces these fats and greases to mix with the original mass of solid components and to settle out with the sediment.

A further objective of this invention is to eliminate or to reduce to an acceptable level the foam generated by mechanical agitation or aeration of the detergent substances contained in the influent sewage. Without the use of the composition of matter of this invention to delimit the rise of the foam layer above the sewage water, the foam will deposit on the concrete walls of the tanks as a hardened scum of calcium and magnesium soaps to be removed tediously by manual scraping.

With the foregoing in view, this invention provides among other useful functions a composition of matter that is strikingly effective in counteracting the excessive fats and greases and in mitigating the abundant detergent foam that both predominate in present day sewage.

The composition of matter of this invention consists of the following components (including certain analogues) and their substantial percentages:

| | Percent |
|---|---|
| Water | 3.0 |
| Oleic acid | 7.7 |
| Diethanolamine | 2.3 |
| Butyl alcohol | 3.4 |
| "Butyl carbitol" or diethylene glycol-monobutyl ether | 19.5 |
| Kerosene | 52.1 |
| Tri-butyl phosphate | 12.0 |

Oleic acid can be replaced or associated with other saturated and unsaturated fatty acids. Diethanolamine can be replaced or associated with monoethanolamine and/or triethanolamine (and its analogues) constitute a coupling or a relating agent. The butyl alcohol serves the purpose of increasing the water soluble phase, developed when the composition of matter interacts with the sewage. Other alcohols, not requiring a red label, can be used in replacement of butyl alcohol. Kerosene is the component of this invented association of ingredients that serves as a diluent, as a defoamer, and as a solvent of the greases and the fats. "Butyl carbitol" or diethylene glycol-monobutyl ether is quite essential as a solvent of fats and can be effectively replaced with carbitol. Tri-butyl phosphate plays a role as a foam inhibitor and is occasionally replaced with tricresyl phosphate. The percentages of the aforesaid several components may range between wide limits.

The formula of this invention, as illustrated in the foregoing preferred embodiment, is added to the influent sewage of a plant or to some specific point in the equipment of a plant to receive the remedial benefit of a localized action. The components of the composition of matter of this invention are strikingly proficient in extremely small concentrations. On an average 0.5 to 2 parts per million of the formula of this invention are readily corrective of the undesirable characteristics of currently produced sewage. Or, in other words, one gallon of the material of this invention effectively treats one million gallons of sewage passing daily through a sewage disposal plant.

When the composition of matter is introduced into the influent sewage there develops a three-phase composition. The partition or distribution coefficients are of such a character that the free energy at the separations is adequate to bring about clean cut and well marked divisions. The top phase lies supernatantly above the influent sewage in order to break loose and to deaerate the fats and the greases so that they become physically competent to intermix with the remainder of the sludge and sediment. Defoaming of the excessive foam caused by the detergents is largely accomplished in the uppermost aqueous phase. Without this necessitous defoaming action, the excessive foam of the sewage deposits as a hard scum or a scale of calcium and magnesium soaps that result from the interaction of calcium and magnesium salts in the water with the abundance of fats and greases of the sewage. Unless the "formula" of this invention or a like equivalent is applied, then recourse to skimmers or clarifiers must be had and the skimmings added separately to the digester. The middle phase treats that portion of the sediment that is subsequently to be intermixed with the treated top phase. Also, in the middle phase a goodly portion of the suspended grease and fats is broken up or emulsified. The bottom phase continues to maintain a deaeration of the effluent sewage in every stage of the disposal plant in order to achieve a higher rate of sedimentation and a more compact sediment. When a more nearly complete removal of the foam producing substances from the effluent sewage is effected, then a uniform agitation of the sewage serves to abate any malodors and a subsequent aeration produces much less foam.

As mentioned previously, the material of this invention may be added directly at any stage of treatment of sewage as a temporary remedial expedient with respect to any of the foregoing problems.

The excessive fats and greases in modern day garbage impose a heavy burden on the disposal of the resulting sewage. Without the "formula" of this invention or a like equivalent the digester plates, the tanks, the pipes of a plant become so coated with grease and fat as to interfere seriously with the necessary digestion that should ensue in the digesters. If digestion is impaired or arrested because of excessive grease, then the inadequately digested effluent sewage becomes malodorous when it is laid down on its drying beds. Without the use of the material of this invention, the non-uniform and inconstant action in a digester gives rise to the development of gas pockets in the effluent sewage contained therein. The internal pressure increases and, suddenly, a gas of a repulsive odor is released with the characteristic sound of a "burp." Not only does the use of the composition of matter of this invention control evenly the gassing action of the bacteria (without any indication whatever of bacteriostasis), but enables the gas formation to proceed at a uniform rate in a digester, whether heated or unheated.

Experimentally, it has been demonstrated repeatedly that the consistent use of the "formula" of this invention in a sewage disposal plant inevitably brings the benefits of a reduced time for the digestion cycle, of an increased compaction of the sediments, of a quickened rate of sedimentation, of less air to maintain the bacterial oxygen demand level, and of less air to hold to a dissolved oxygen level with respect to the effluent sewage in the plant.

Although this invention has been described in detail, yet such a description is intended primarily to be illustrative rather than limitative, since this invention may be variously and differently embodied and, therefore, its scope and purview are to be determined as claimed.

Having thus described this invention, what is claimed as new is:

A method of treating sewage containing unfavorable concentrations of fats, greases, and foam-producing detergents that consists in admixing approximately 3.0% water with approximately 7.7% oleic acid, approximately 2.3% diethanolamine, approximately 3.4% butyl alcohol, approximately 19.5% diethylene-glycol monobutyl ether, approximately 52.1% kerosene, and approximately 12.0% tributyl phosphate and pouring said admixture in the relation of 1 part into 1,000,000 parts of influent sewage, thereby causing a reduced foam level, a de-aeration and a dissemination of surface fats and greases, an elimination of foul odors, and a compaction of a useful sediment.

References Cited by the Examiner

UNITED STATES PATENTS

| 2,034,460 | 3/1936 | Darcey | 252—175 |
| 2,583,165 | 1/1952 | Campbell | 252—118 |
| 2,901,433 | 8/1959 | Spring | 252—118 |

OTHER REFERENCES

Chemical Industries: "The Alkyl Esters of Phosphoric Acid," Adler (1942), p. 518.

SAMUEL H. BLECH, *Primary Examiner.*

JULIUS GREENWALD, LEON D. ROSDOL,
*Examiners.*

S. E. DARDEN, *Assistant Examiner.*